(12) United States Patent
Mohajer

(10) Patent No.: US 9,390,434 B2
(45) Date of Patent: Jul. 12, 2016

(54) SYSTEMS AND METHODS FOR SEARCHING CLOUD-BASED DATABASES

(71) Applicant: SoundHound, Inc., Santa Clara, CA (US)

(72) Inventor: Keyvan Mohajer, Los Gatos, CA (US)

(73) Assignee: SoundHound, Inc., Santa Clara, CA (US)

( * ) Notice: Subject to any disclaimer, the term of this patent is extended or adjusted under 35 U.S.C. 154(b) by 0 days.

(21) Appl. No.: 13/890,194

(22) Filed: May 8, 2013

(65) Prior Publication Data
US 2013/0254029 A1    Sep. 26, 2013

Related U.S. Application Data

(63) Continuation of application No. 12/861,775, filed on Aug. 23, 2010, now Pat. No. 8,694,534.

(60) Provisional application No. 61/368,999, filed on Jul. 29, 2010.

(51) Int. Cl.
*G06F 17/30* (2006.01)
*G06Q 30/02* (2012.01)

(52) U.S. Cl.
CPC ...... *G06Q 30/0256* (2013.01); *G06F 17/30663* (2013.01); *G06F 17/30864* (2013.01); *G06F 17/30899* (2013.01)

(58) Field of Classification Search
CPC .................. G06F 17/30864; G06F 17/30663
USPC ...................................... 707/769; 705/14.54
See application file for complete search history.

(56) References Cited

U.S. PATENT DOCUMENTS

| | | | | |
|---|---|---|---|---|
| 8,296,179 | B1 * | 10/2012 | Rennison | 705/14.26 |
| 2004/0193420 | A1 * | 9/2004 | Kennewick et al. | 704/257 |
| 2006/0242017 | A1 * | 10/2006 | Libes et al. | 705/14 |
| 2008/0154951 | A1 * | 6/2008 | Martinez et al. | 707/103 Y |
| 2008/0255937 | A1 * | 10/2008 | Chang et al. | 705/14 |
| 2009/0064029 | A1 * | 3/2009 | Corkran et al. | 715/781 |
| 2010/0250497 | A1 * | 9/2010 | Redlich et al. | 707/661 |

* cited by examiner

*Primary Examiner* — Joshua Bullock
(74) *Attorney, Agent, or Firm* — Carr & Ferrell LLP

(57) ABSTRACT

Systems and methods for searching cloud-based databases are provided herein. A service provider may have a need to make their database(s) searchable through search technology. However, the service provider may not have the resources to implement such search technology. The search technology may allow for search queries against these cloud-based databases. The technology described herein provides a solution addressing the service provider's need, by giving a search technology that furnishes search results in a fast, accurate manner. In further embodiments, systems and methods to monetize those search results are also described herein.

25 Claims, 6 Drawing Sheets

SYSTEMS AND METHODS FOR SEARCHING CLOUD-BASED DATABASES

CROSS REFERENCES TO RELATED APPLICATIONS

This nonprovisional patent application is a continuation of U.S. patent application Ser. No. 12/861,775 filed on Aug. 23, 2010 (Issued as U.S. Pat. No. 8,694,534 on Apr. 8, 2014), which claims the priority benefit of provisional U.S. Patent Application Ser. No. 61/368,999 filed on Jul. 29, 2010, all of which are hereby incorporated by reference in their entirety.

FIELD OF THE INVENTION

The present invention relates generally to searching databases. The invention relates more particularly to systems and methods for searching databases of service providers on a network.

SUMMARY OF THE INVENTION

Service providers, such as owners of mobile services and/or applications, may offer services, products, and/or content to end users through a computer network. A service provider may wish to allow end users to search one or more databases that are used in the services, products, and/or content provided by the service provider. An example of a service provider may be an owner of a mobile business directory application who wishes to voice-enable his or her business directory application. An enhanced search experience can significantly improve the user engagement and ultimately success of the service and/or application, particularly in mobile environments. However, both the infrastructure and the technology for providing search functionality may not be owned, licensed or be otherwise accessible to service providers. As an example, if a service provider wishes to implement voice-enabled search with their mobile service, it would be difficult to do so because the conventional infrastructure for search technology may be complicated and expensive to establish.

In accordance to some embodiments of the present technology, an exemplary method for searching one or more databases includes several steps such as (a) receiving a database from a service provider via a network, the database having one or more records, the one or more records comprising at least one field; (b) storing the database in a cloud-based data store; (c) receiving a search query via the network, the search query comprising search parameters of the at least one field of the one or more records of the database; (d) determining one or more search results in the database, based upon the search parameters of the search query; and (e) transmitting for display the one or more search results via the network.

In various embodiments, the technology comprises a system for searching a database. The system comprises: (a) a communications module configured to receive the database from a service provider via a network, the database having one or more records, the one or more records comprising at least one field; and (b) a processor for executing instructions stored in memory to: (i) receive a search query via the network, the search query comprising search parameters of the at least one field of the one or more records of the database, the search query provided by sound data input by an end user; (ii) store the database in a cloud-based data store; (iii) determine one or more search results in the database, based upon the search parameters of the search query; and (iv) transmit for display the one or more search results to the end user via the network.

According to other embodiments, the present technology may comprise a method for providing one or more search results. The method may comprise the steps of: (a) receiving a search query via a network, the search query comprising one or more query chunks of at least one field of one or more records of a database, the database being received from a service provider and being stored on a cloud-based data store; (b) determining the one or more search results in the database, based upon the one or more query chunks of the search query; (c) selectively transmitting for display in real time to the end user, via the network, one or more fields of the one or more search results; and (d) selectively transmitting for display in real time to the end user, via the network, one or more additional fields of the one or more search results.

DETAILED DESCRIPTION

Figure 1:
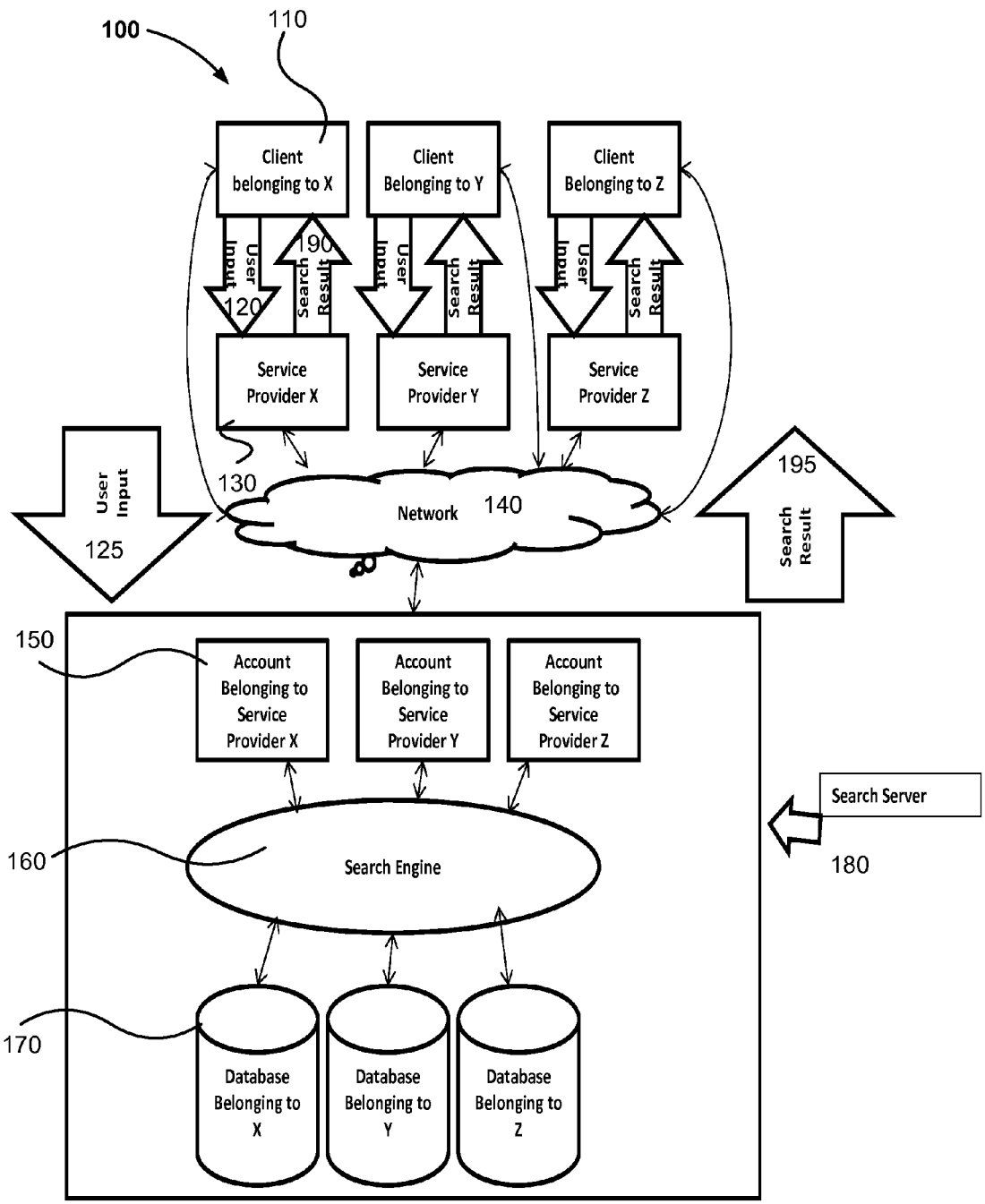
FIG. 1 is a block diagram of an exemplary system for searching one or more databases in accordance with various embodiments of the present invention.

Various embodiments of the present invention provide systems and methods for searching one or more databases. In some exemplary embodiments, the present technology may allow for databases of service providers to be searched by one or more end users within a network. Service providers offering services, products, and/or content to end users through a computer network may store records accessible to the end users in one or more databases. Further, a service provider may wish to allow end users to search the one or more databases. For example, if the service provider provides end users with listings of restaurants and information associated with the restaurants (e.g., reviews and end user comments), it would be beneficial to give end users the ability to search for records pertaining to restaurants quickly and easily. However, conventional search engines may be difficult and costly to implement. This is further compounded by the fact that oftentimes, service providers do not own the infrastructure and/or the technology to enable such search experience for their end users.

According to various embodiments of the present invention, systems and methods are provided herein that are related to searching databases of service providers. In exemplary embodiments, the technology presented herein easily makes a service provider's database of records searchable through a computer network without the need to develop the search technology. In further embodiments, the technology furnishes relevant search results along with deep relevant content to the end users quickly. In yet further embodiments, the technology allows for the monetization of the search results.

Further, systems and methods for searching one or more databases using cloud computing are described herein. An exemplary system for searching a database may include a communications module configured to receive the database from a service provider by a database upload via a network, the database having one or more records, the one or more records including at least one field. The system may also include a processor for executing instructions stored in memory to process the one or more records of the database based on the at least one field. The processor may also execute instructions stored in memory to: receive a search query via the network, the search query including search parameters of the at least one field of the one or more records of the processed database, the search query provided by sound data input by an end user; determine one or more search results in the processed database based upon the search parameters of the search query; and transmit for display the one or more search results to the end user via the network.

By using cloud computing to provide search capability to the one or more databases, a service provider may take utilize the computing resources, software and information provided by the cloud, without having to invest the time and resources into providing search ability using conventional means. For instance, according to various embodiments, a service provider may wish to enable its users to search its database by speaking all or parts of a field in their database of records. In such an embodiment, the service providers may take advantage of a speech recognition search engine without having to develop the necessary technology and infrastructure, yet still maintain control over the manner in which the search results are presented to the users.

Furthermore, a service provider may wish to enhance the presentation of search results to the end user to gain competitive advantage over competitors of the service provider. Systems and methods for providing search results are described that may enhance the speed of searching and enhance the search results with images and/or rich content. An exemplary system for providing one or more search results may include a communications module configured to receive a search query via a network. The search query may include one or more query chunks of at least one field of the one or more records of a processed database. The search query may be provided by sound data input from an end user. The exemplary system may also include a processor for executing instructions stored in memory to: determine the one or more search results in the processed database, based upon the one or more query chunks of the search query; selectively transmit for display in real time to the end user, via the network, one or more fields of the one or more search results; and selectively transmit for display in real time to the end user, via the network, one or more additional fields of the one or more search results. By utilizing the cloud computing network, a service provider may be able to provide search results along with additional content that may enhance the search experience for end users, thereby providing enhanced functionality without any additional burden being placed upon the service provider.

Finally, exemplary embodiments of a cloud computing system as described herein may be monetized for service providers and other parties by providing advertising with the search results. An exemplary system for providing advertising in one or more search results may include a network having at least one service provider and one or more end users. The system may also include a server coupled to the network that is configured to receive a database from the at least one service provider by a database upload via a network. The database may include one or more records, the one or more records having at least one field. The server may also be configured to process the one or more records of the database based on the at least one field. The server may be further configured to receive a search query via the network. The search query may include search parameters of the at least one field of the one or more records of the processed database, and may be provided by sound data input from an end user. One or more search results may be determined in the processed database, based upon the search parameters of the search query.

Additionally, the server may be configured to search an advertisement database based upon the search query or the one or more determined search results and generate one or more advertisement results across the one or more application verticals, based upon the search of the advertisement database. The one or more search results may be transmitted for display to the end user via the network, and the one or more advertisement results may also be transmitted for display via the network, where the one or more advertisement results are associated with the one or more search results.

Service providers and/or advertisers may thereby provide advertising across one or more service application verticals, by utilizing the resources of the cloud network, instead of being required to employ a separate advertising system. In an exemplary embodiment, the position of the search results may be influenced using a bidding process when advertising is delivered onto application verticals, thereby generating additional revenue from the provided advertising. Service providers may have an additional incentive to utilize the described methods and systems for searching databases by receiving a portion of the revenues generated by advertising in accordance with various embodiments. To further customize the advertising, search query history and information relating to the end user may also be utilized to potentially increase the effectiveness of advertising.

It will be noted that as used herein the term "cloud computing" encompasses network-based computing, where computing resources, software and information are provided over the network and are accessible by service providers and/or user devices. User devices may include but are not limited to desktops, PCs, laptops, notebooks, game consoles (e.g., an X-box), music players, tablets, IPods, Smartphones, automobile computer systems, and Internet enabled TVs. A Smartphone may be generally defined as a phone with computing capability. A Smartphone may provide Internet access to an end user.

FIG. 1 is a block diagram of an exemplary system 100 for searching one or more databases in accordance with various embodiments of the present invention. The system 100 may include one or more clients 110, one or more service providers 130, a network 140, and a search server 180. The search server 180 may include one or more accounts 150, a search engine 160, and one or more databases 170. In various embodiments, the one or more databases 170 may belong to one or more service providers 130.

As with all of the figures provided herein, one skilled in the art will recognize that any number of elements can be present in the exemplary system 100 and that the exemplary methods described herein can be executed by one or more of elements. Any number of any of elements can be present in the exemplary system 100, and the exemplary system 100 is configured to serve these elements. For example, the search server 180 may communicate search results via the network 140 to the one or more clients 110, despite the fact that only three clients are shown in FIG. 1. For all figures mentioned herein, like numbered elements refer to like elements throughout.

The one or more clients 110 may be a user device used by the end user to access a network 140. In various embodiments, the client 110 may be a user device used to access the service provider 130 and/or one or more of the databases 170 via the network 140. The client 110 may include network browser applications (not shown) configured to render content pages, such as web pages from the Internet. The client 110 may communicate with the service provider 130 over the network 140.

The one or more service providers 130 may provide a service to at least one client 110 over a network. Examples of such services may include providing video content, and/or providing information regarding entertainment, restaurants, and the like. The service may be a web service that allows end users to access the service and/or software over the Internet (e.g., by using a user interface loaded in a web browser).

A given service provider 130 may have an account 150 on the search server 180. The account 150 may include account information related to the service provider's account. The included account information may include authentication information, billing information and/or contact information as described below. An account 150 may be a prerequisite before a service provider may gain access to the search server and provide the one or more databases 170 to the search server 180. The one or more databases 170 may be stored on the search server 180. Furthermore, the one or more databases 170 may be received onto the search server 180 using a database upload. The database upload may be performed, for example, over the network 140.

The network 140 can be any type of network, including but not limited to the Internet, LAN, WAN, a telephone network, and any other communication network that allows access to data, as well as any combination of these. The network 140 may be a public network (e.g., the Internet) or a private network, and may take the form of a wired or wirelessly network.

The one or more service providers 130 may receive a user input 120 from the one or more clients 110. The user input 120 may be entered using the user device, for example, and include a search query. The search query may be a request for information contained within the one or more databases 170, and may include search parameters, as described further below. The search query may furthermore include sound data input by the end user onto the client 110. The user input 120 may be relayed to the search server 180 via the network 140. As shown in FIG. 1, the search server 180 may accommodate user inputs 125 from one or more service providers 130. Also, as shown in FIG. 1, a user input 120 may be relayed to the search server 180 through the service provider 130, or may be transmitted to the network 140 without being relayed by the service provider 130.

One or more search engines 160 may be used to process the one or more databases 170 as described below and provide search functionality for the databases 170. The search engine 160 may also be used to generate search results from the databases 170. The search of the one or more databases 170 may be performed by a single search engine, or by multiple search engines, where each search engine performs searches based upon a different type of search query. For example, a text search may be performed by a first search engine, while a spoken word search may be performed by a second search engine. The search results may include one or more records from the databases 170 that match or are related to one or more search parameters of the search query.

Using the search engine 160, the search server 180 may transmit one or more search results 190 from the databases 170 in response to the user input 120. Using the network 140, the search results 190 may be transmitted to the service provider 130, and the service provider 130 may relay the search results 190 back to the client 110. As shown in FIG. 1, the search server 180 may determine and transmit search results 195 from one or more service providers 130. Furthermore, a search result 190 may be relayed to the client 110 through the service provider 130, or may be transmitted via the network 140 without being relayed through the service provider 130. The system 100 may thereby provide search functionality to the one or more databases 170. Among other benefits, the system 100 may advantageously provide advanced search ability, such as searching using sound data, by storing and processing the one or more databases 170 outside of the infrastructure of the service providers.

Figure 2:
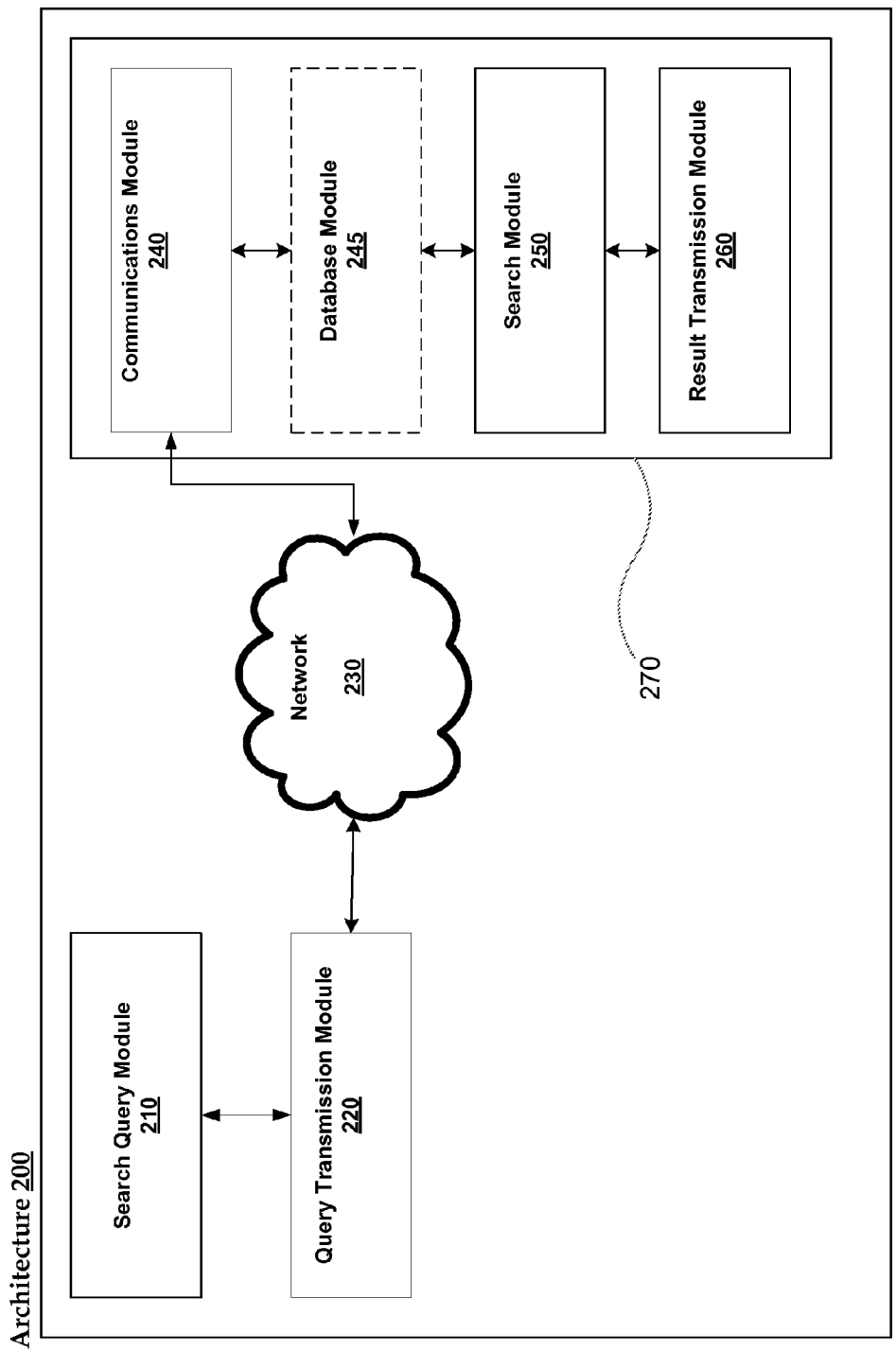
FIG. 2 is a block diagram of an exemplary system for searching one or more databases in accordance with various embodiments of the present invention.

FIG. 2 illustrates an exemplary architecture 200 associated with a search server 270 (such as the exemplary search server 180 shown in FIG. 1). The architecture 200 includes a search query module 210, a query transmission module 220, a network 230, a communications module 240, a search module 250, and a result transmission module 260. Alternative embodiments may comprise more, less, or functionally equivalent modules. Although various modules may be configured to perform some or all of the various steps described herein, fewer or more modules may be provided and still fall within the scope of various embodiments.

The search query module 210 may receive a search query from a search query originator. In various embodiments, a search query originator may be an end user utilizing a user device or a server operated by the service provider. The search query originator may provide the search query for use by the search module 250. Furthermore, the search query originator receives search results provided by the search server 270 via the network 230 after a search has been performed by search module 250.

The search query may include an end user's request for information of a database on the search server 270. The search query may be received in any suitable form. For example, an end user may furnish the search query or a portion of the search using a microphone to capture sound data. Furthermore, the end user may use a camera or similar recording device to include an image in the search query. The contents of the search query may include sound data, text, spoken words, image, other data, or any combination thereof. In some embodiments, the search query module 210 may provide one or more user interfaces on the user device to input the search query (e.g., a button on a display screen, or a plurality of buttons on the display screen, which may be used to specify a service provider).

After the search query module 210 receives the search query, the search query may be provided to the query transmission module 220, which may transmit the search query to the communications module 240 via the network 230. The network 230 may be any suitable computer network or plurality of networks permitting communication between a service provider and/or an end user and the search server 270. The network 230 may include any type and number of databases, servers, end users, computing devices, and policy engines.

In some exemplary embodiments, the query transmission module 220 may perform a step of dividing the search query into one or more query chunks. A query chunk may be a predetermined fragment or a portion of the search query. A query chunk may be of any size. For example, if the search query includes spoken words, the query chunks may include words or phrases from the words spoken by the end user. Likewise, if the search query includes text and sound data, then the text may be divided into a separate chunk from the sound data. Because the search query may include large amounts of data, dividing the search query into chunks may advantageously increase the speed at which the search request is received and processed in some embodiments. The increase in speed may be derived from reductions in transmission delay and the effects of network latency due to transmission of smaller query chunks instead of an entire search query.

Together, the communications module 240, the database module 245, the search module 250 and the result transmission module 260 may be considered to constitute a search server 270. The communications module 240 may perform a step of receiving one or more databases from a service provider (such as the step 310 of the method 300 described below in relation to FIG. 3). The one or more databases may be stored on the search server 270, in the database module 245, for example, and may be transmitted to the search module 250 for processing as described below.

Figure 3:
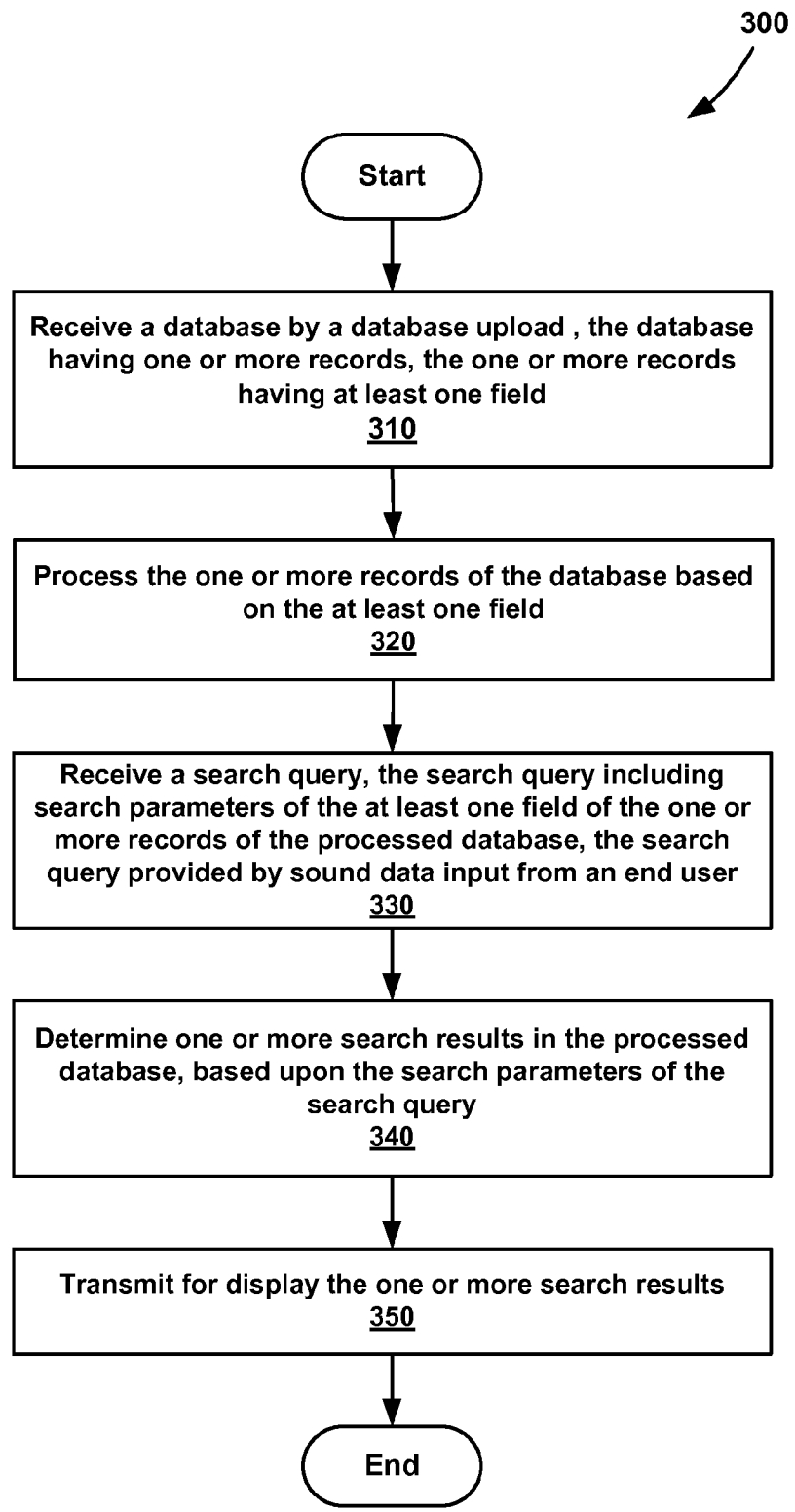
FIG. 3 is a flow chart of an exemplary method for searching a database in accordance with various embodiments of the present invention.

The communications module 240 may perform a step of receiving a search query (such as the step 330 of the method 300 described below in relation to FIG. 3). The search query may then be transmitted to the search module 250 for purpose of performing a search, as described below.

The database module 245 may store the one or more databases received from the service provider. The one or more databases may be stored prior to processing by the search module 250 and/or after the processing has taken place. If the database module 245 has not yet received a database from the service provider, then the database module may not contain any databases. By storing one or more databases on the database module 245, and processing and searching of the one or more databases may advantageously be performed outside of the infrastructure of the service provider.

The search module 250 may perform the steps of processing the one or more records of the database (such as the step 320 of the method 300 described below in relation to FIG. 3). In an exemplary embodiment, the search module 250 may optionally determine search parameters of the search query, although in other embodiments the search parameters may be received with the search query by the communications module 240. The search module 250 may also perform the step of determining one or more search results in the processed database (such as the step 340 of the method 300 described below in relation to FIG. 3). The aforementioned steps may be performed by separate modules, or by the same module (as shown in FIG. 2) according to various embodiments.

The result transmission module 260 may perform a step of transmitting one or more search results for display to the end user via the network 230 (such as the step 350 of the method 300 described below in relation to FIG. 3). The search results may be transmitted to a service provider and relayed to the end user for display. The search results may alternatively be transmitted to the end user for display directly on the user device. It will be appreciated by one skilled in the art that the system in FIG. 2 may be merged with or used in conjunction with any of the other exemplary systems described herein FIG. 3 is a flowchart of an exemplary method 300 for searching a database. At step 310 of the method 300, one or more databases may be received from a service provider by a database upload via a network, where the database has one or more records and the one or more records include at least one field. When the service provider provides a web service, for example, a record may correspond to one or more web pages that include Internet content. In exemplary embodiments, the at least one field may include content associated with the one or more web pages, such as text that appears on the one or more pages, as well as images and other audiovisual content associated with the one or more web pages.

In exemplary embodiments, a record may have fields that include at least one of a destination web address field, a record description field, a record image field, and a record rich content field, or any combination thereof. The destination web address field may provide a location of the web page. The record description field may include a brief description of the Internet content associated with the web page. The record image field may include one or more images located on the web page or associated with the web page. The record rich content field may include any suitable audiovisual content associated with the web page, including, but not limited to, sound data, video data, image data, visual effects, and the like. The record rich content field may be populated with data that may be presented when the web page is accessed, or may be presented when the record is a part of a search result. Each field may be populated as desired by the service provider, thereby giving the service provider the ability to control what records in the database are provided in response to a search query while utilizing the cloud computing network. Furthermore, by providing rich content in a field associated with a record in the database, the service provider may affect how search results are presented or otherwise rendered on a user device.

In an optional step of the method 300, account information may be received from the service provider. The account information may include authentication information, billing information and contact information. The account information may be received to create an account on the search server 180, thereby allowing the service provider to utilize the search functionality described herein. Authentication information may include a name and password that provide the service provider the ability to access the appropriate account. Billing information and contact information for the service provider may be provided as well, to facilitate receiving compensation in exchange for the search functionality or search results provided by the search server 180. Further details regarding compensation and/or sales revenue related to search functionality or search results are provided later herein.

Having an account on the search server may allow a service provider to submit one or more customized databases to search server 180, and make changes to such databases when desired by the search provider. Data may be received from the service provider to add, delete, or otherwise modify the one or more records in the database, thereby providing the service provider with flexibility in managing and editing the database even after the database has been received (by the search server 180, for example). This modification may also be automated using an authenticated script in some embodiments.

At step 320 of the method 300, the one or more records of the database may be processed based on the at least one field. The processing of the database provides information regarding one or more fields that may allow the search server to compare the information for each record to search parameters of the search query. According to various embodiments, the search server may determine if there is a match, relevancy, relatedness, association or a certain type of relationship between a record and the search parameters of the search query, thereby warranting the inclusion of the record in a listing of search results returned to the end user.

For example, when the search query includes sound data, processing the database based on the at least one field may further include processing the database to produce a phonetic data for each of the one or more records of the database. The phonetic data may include variations of spoken forms of text data in the at least one field. In exemplary embodiments, the database may be processed to produce phonetic data as described in U.S. Patent Application Publication No. 2010/0121643, filed on Nov. 2, 2009, entitled "Melodis Crystal Decoder Method and Device" to Keyvan Mohajer et al., which is hereby incorporated by reference in its entirety. In such embodiments, the service providers may receive the benefit of a speech recognition search engine without having to develop the necessary technology and infrastructure independently.

Likewise, when the search parameters include text data, processing the database may include identifying keywords from the one or more fields. Furthermore, when the search parameters include image data, processing the database may include scanning one or more fields containing record image data to identify facets of the record image data for comparison with the search parameters.

In an optional step, the processed database may be stored, on the search server 180 of FIG. 1, for example. Such an embodiment may be advantageous because the search server will not be required to reprocess the database each time a search query is received, thereby potentially saving time and providing a quicker response to the search originator.

At step 330 of the method 300, a search query may be received via the network, where the search query includes search parameters of the at least one field of the one or more records of the processed database. Furthermore, the search query may be provided by sound data input from an end user. The search parameters may be facets or features of the search query. Such facets may be compared to the standardized information produced for each record when the database is processed to determine relevance of a record in the database. Search parameters may include a portion of the search query or the entirety of the search query (e.g., when the search query is text, the search parameters may be words or combinations of words within the search query). Search parameters may also be derived from the search query in some embodiments (e.g., by the search module 250). For example, when the search query includes sound data, the search parameters may include phonetic facets of the sound data, either in numeric or graphical form.

At step 340 of the method 300, one or more search results may be determined in the processed database, based upon the search parameters of the search query. The determining one or more search results in the processed database may be performed by matching the search parameters with the at least one field of the one or more records of the database, for example, or by comparing the search parameters to the information produced when the one or more databases are processed. Search results may be identified by determining which records include information that most closely resembles the search parameters. The matching may be based on similarity between the search parameters and the one or more fields. In various exemplary embodiments of the technology, search parameters may be compared against the information produced when the one or more databases are processed to identify records that are relevant, related, associated or have a certain type of relationship to that of the search parameters.

In exemplary embodiments, when the search parameters are compared with the information for a record in the database, a score may be assigned to the record based upon how similar the information is to the search parameters. The search results may then include records having the greatest degree of similarity to the search parameters (i.e., records with a similarity score that is highest or lowest, depending on how the scoring is performed).

As an example, if the processed database includes phonetic data for each record, the matching may be performed by comparing the search parameters (e.g., phonetic facets of the sound data) of the search query with the phonetic data for each record to determine matches that fall within a predetermined tolerance. If the matching record has greater than the predetermined tolerance of similarity to the search query, then the matching record may be included within the search results.

In various embodiments, the search query may also include a command. The method may further include the optional step of performing a search action of the database based upon the command. The command may provide a way for an end user to further customize and/or narrow search results. The command may take the same form as the search query (e.g., spoken words, text, etc.), or may take a different form. For example, the command may include restricting the search results to the ten most similar records in the one or more databases, or may include restricting search results to a specific geographic location. The search server may recognize the command as an additional search parameter, and implement the command by performing the specified action in various exemplary embodiments.

At step 350 of the method 300, the one or more search results may be transmitted for display to the end user via the network. As stated hereinabove, the one or more search results may be transmitted to the service provider, or may be provided to the end user on a user device. The search results may be provided in a list form, or any other suitable form, and may be rendered together or one-by-one on a display for the end user. Also, the fields of the records included within the search results may also be transmitted for display to the end user. For example, search results may include thumbnail images for each record displayed, where the thumbnail images are stored in a field in the database for each record.

Various methods may be utilized to organize the one or more search results for when the search results are displayed to the end user. For example, the at least one field for each record may include ranking priority. The ranking priority may be assigned by the service provider, and may be based on a desired search result order. The one or more search results may then be organized based upon the ranking priority.

Embodiments utilizing ranking priority may be advantageous because the service provider may then be able to present search results in a desired order by merely providing a ranking priority in the one or more databases to be searched. For example, if the database includes names of actors as records, it is likely that multiple actors may have the same name. By using a ranking priority field, the service provider may indicate that more popular actors having a given name is provided to an end user before lesser known actors having the same name. By assigning the highest ranking priority to the most popular actor, the service provider may affect the search results while utilizing the cloud computing network for searching the one or more databases.

It will be appreciated by one skilled in the art that the method 300 may allow service providers to utilize the cloud computing network to provide search functionality for one or more databases. That is, the technology allows for the delivery of search and monetization functionalities to service providers, including software developers. To facilitate utilization of the search server, application programming interfaces ("APIs") and software development kits ("SDKs") may be provided to service providers. Furthermore, by allowing service providers to index and organize the one or more databases in the computing cloud, the method 300 may provide search functionality without having to create an index to the one or more databases independently. Furthermore, in exemplary embodiments, by allowing service providers to index their data in the exemplary cloud systems presented herein and by utilizing this technology to search by voice, database search results will be transmitted faster and more accurately than a conventional two-step process of voice to text conversion followed by a text search.

In addition to providing search functionality for databases provided by service providers, a search server (such as the exemplary search server described herein) may provide standalone search engine capability. To do so, the databases that are accessible by the search server and the information produced when the one or more databases (or indices) are processed may be aggregated to produce an aggregated processed database. An end user may then use a search engine user interface to provide a search query to the aggregated processed database. The search engine user interface may use any suitable interface. In various embodiments of the present technology, the search engine user interface may be actuated using a single button in various embodiments. As a result of user input via a search engine user interface, the aggregated processed database may be searched and search results may be transmitted for display to the end user. One exemplary method for searching the aggregated proceeded database is provided herein in the method 300.

Figure 4:
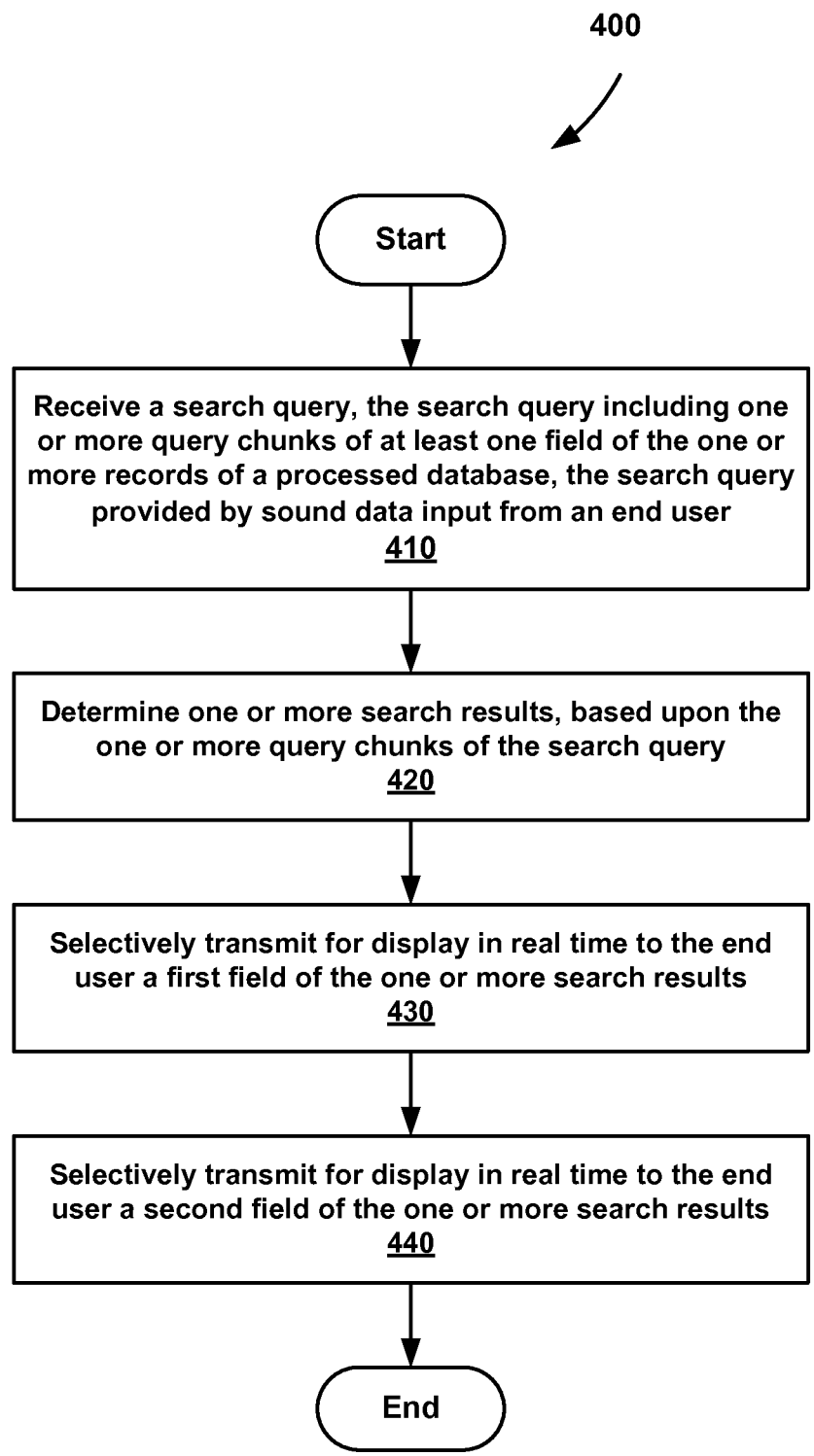
FIG. 4 is a flow chart of an exemplary method for providing search results in accordance with various embodiments of the present invention.

FIG. 4 is a flowchart of an exemplary method 400 for providing search results. At step 410 of the method 400, a search query may be received via a network. The search query may include one or more query chunks, as described above, and the search query may be provided by sound data input from an end user. The search query may be divided into query chunks before being received by the search server in some embodiments (e.g., the search query may be divided by the client, and/or by the service provider). However, the search query may also be divided into chunks by the search server when received, and the present technology is not limited in this regard. Notably, the query chunks may be sent over a two-way connection between the search server and the search originator. Such a two-way connection may be advantageous because the search query may be sent to the search server in one or more query chunks in real time as the search query is collected from the end user.

The one or more query chunks may include at least one field of the one or more records of a processed database, where the database may be processed as described above. By including at least one field, search process may be expedited in an exemplary embodiment. For example, text data from the search query may be transmitted in a query chunk before chunks related to sound and/or image content, which may allow the search server to process and return results for the text data portions of the search query before or while the sound and/or image content are being received and/or compared to records in the database. Such embodiments may increase search speed and enhance the end user experience by reducing the effects of network latency and transmission delay.

Also, when the search query includes sound and/or image data, dividing the search query into query chunks may further expedite the search process. The query chunks may be of substantially equal size, or may be of varying sizes depending upon the requirements and preferences of the search provider. Dividing the search query into chunks may allow the search server to process received query chunks and provide search results without having to wait for the entire search query to be received. Such embodiments may enhance the end user's search experience, particularly when the search query includes large amounts of sound and/or image data.

At step 420 of the method 400, the one or more search results may be determined in the processed database, based upon the one or more query chunks of the search query. The one or more search results may be determined using received query chunks, which as described above may lead to increased search efficiency since the search server does not need to wait until the entire search query has been received before determining search results. Search parameters may be derived and/or extracted from the query chunks and compared to information from records in the processed database.

As described above, search results may be determined based upon the search parameters of the query chunks. In various embodiments, the search results may be refined as subsequent query chunks are received by the search server. For example, a list of search results may be determined using a first query chunk. The list of search results may be reordered when a second query chunk is received by searching the search results using search parameters from the second query chunk. Such an embodiment may provide a search result list more efficiently by not requiring searching the entire database using each query chunk.

At step 430 of the method 400, one or more fields of the one or search results may be selectively transmitted for display in real time to the end user, via the network. Each field of a record may include a different type of data, such as text data, sound data, and rich content, as described above. The selective transmission of one or more fields may take place by, for example, selecting fields that are relatively smaller in size compared to other fields. By selectively transmitting one or more fields of records within the search results, the search server may transmit fields containing data that is relatively smaller in size compared to data in additional fields. Fields containing relatively smaller data, such as text data, may be transmitted across the network more efficiently than if data in additional fields were transmitted. By providing search results more rapidly, the user search experience may be enhanced.

For example, the selectively transmitted field or fields of the one or more search results may include text, which may advantageously provide a user with search results more rapidly than if the user were required to wait for additional fields (such as image and sound data) to be loaded before receiving the search results on a display. The one or more search results may be organized in a search result list, which may be presented to the end user so that the end user may have multiple results to select from. Each of the one or more search results may be rendered to the end user one by one, to further expedite the receiving of search results, rather than waiting for all search results to be received before rendering on the display.

At step 440 of the method 400, one or more additional fields of the one or more search results may be selectively transmitted for display in real time to the end user via the network. The additional field or fields of the one or more search results may include one or more images, and/or rich content in various embodiments. The additional fields may enhance the search experience by providing audiovisual content that stimulates the user and makes the search experience more rewarding.

Rich content may be used to enhance the presentation of the search results and/or search result list. Rich content may be provided for each record by the service provider, or may automatically be provided by the search server. Examples of rich content may include sound and/or visual effects, images, animation, video content or any combination thereof. There are numerous ways that the rich content may be used to enhance the user experience. For example, search results may be presented with audio brackets that cause sound effects to be played when actuated by a user. Sound effects may be utilized while loading rich content and/or loading a list of search results. The rich content may also be used to assist in the presentation of search results, by using a transparent overlay, or by using futuristic graphics and/or graphical effects to accompany the presentation of one or more records within the search results. For some computing devices (such as the iPad), convenient applications or applets may be presented on a first portion of the display (such as the left hand side of the display), while a list of search results may be presented on a second portion of the display (such as the right hand side of the display).

The rich content of the one or more search results may be transmitted and/or downloaded in the background (such that the rich content is not displayed to the end user), while the selectively transmitted field or fields of the one or more search results are displayed to the end user, thereby allowing the end user to view the search results while the rich content is being loaded. Additional rich content, such as video animations may be played for the end user while search results and/or the rich content are being loaded to further entertain and engage the end user. After the selectively transmitted field or fields of the one or more search results has been displayed to the end user, the rich content of the one or more search results may then be displayed to the end user.

Figure 5:
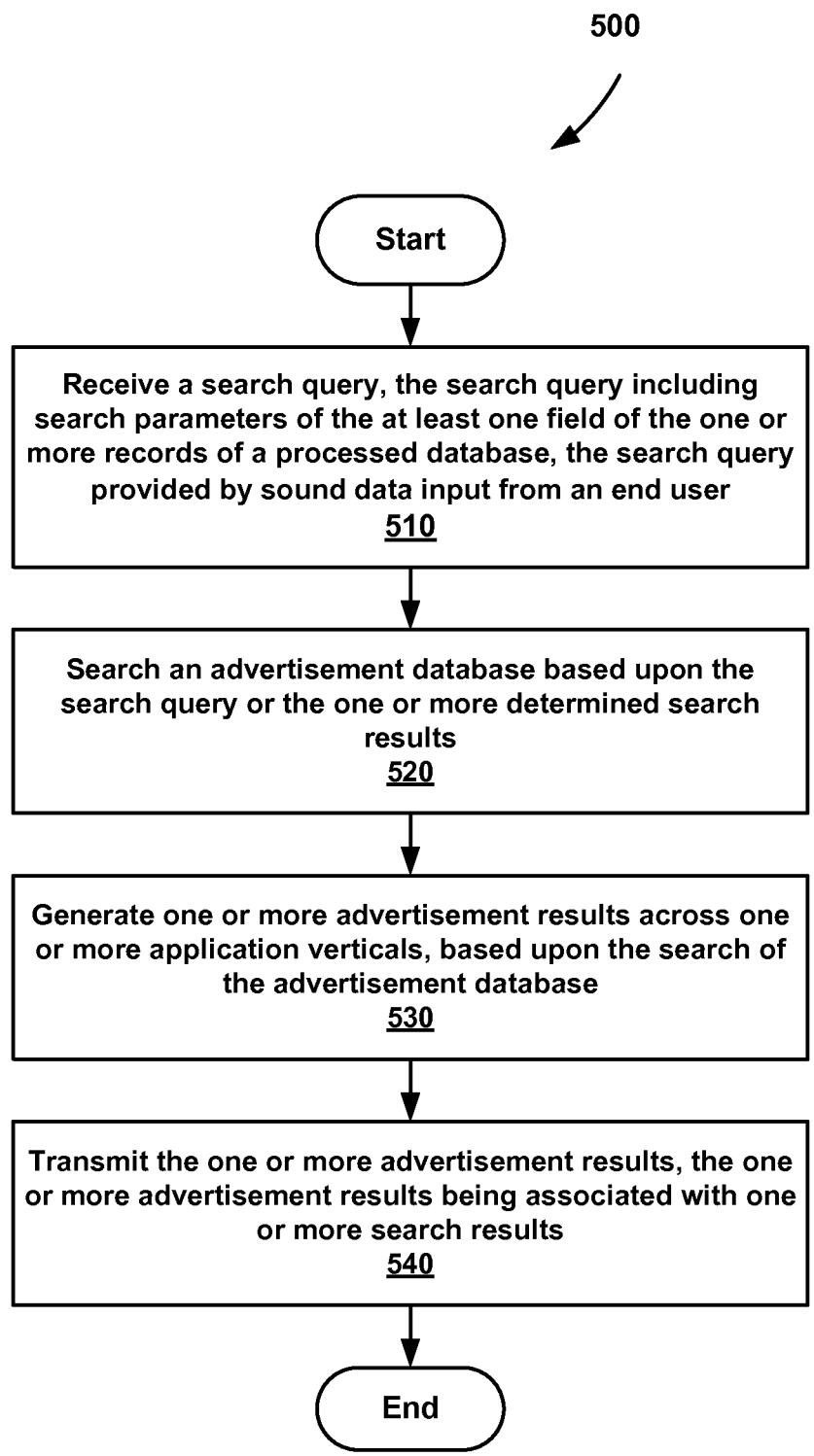
FIG. 5 is a flow chart of an exemplary method for providing advertising in accordance with various embodiments of the present invention.

FIG. 5 is a flowchart of an exemplary method 500 for providing advertising in one or more search results. At step 510 of the method 500, a search query may be received for one or more application verticals via a network, the search query comprising search parameters of the at least one field of the one or more records of a processed database. The search query may be provided by sound data input from an end user using a user device. A vertical application may be an application defined for a narrowly defined market or content area, such as an application for locating restaurants, or an application for viewing content regarding movies, for example. A vertical application may be owned and/or controlled by a service provider 130. The receiving of the search query may be performed as described above. The search query may be directed towards a vertical application, which may be the service provider associated with the processed database. The search query may be processed, and search results may be transmitted as well, in accordance to method 300 described above in various embodiments.

At step 520 of the method 500, an advertisement database may be searched based upon the search query or the one or more determined search results (e.g., the search results determined in step 340). The advertisement database may also be searched based upon a search history that comprises historic search parameters in some embodiments. The search history may include one or more historic search queries, each having associated historic search parameters. The historic search parameters may reflect network use tendencies of an end user, such as web sites frequently visited by the end user, search queries frequently received from the end user, and the like.

The search history may include various combinations of historic search queries tailored to affect the search of the advertisement database. The search history may include the search parameters of the search query, for example, so that the advertisement results are tailored to reflect the search query. The search parameters may be used alone, or in combination with other historic search parameters to search the advertisement database.

In some embodiments, the search history may include search parameters from all search queries associated with a single service provider (e.g., the service provider associated with the processed database, or a service provider that has negotiated for the right to provide advertisement on searches of the processed database). Such an embodiment may be advantageous because advertisement results may be provided that are more relevant to the user's search query, thereby enhancing the search experience while monetizing the search experience for advertisers.

In further embodiments, the search history comprises search parameters from all search queries associated with a plurality of service providers. Such embodiments may provide the end user with a variety of advertisements reflecting the end user's preferences, as reflected in the historic search parameters. Again, such an embodiment may be advantageous because advertisement results may be provided that are more relevant to the user's search query, thereby enhancing the search experience while monetizing the search experience for advertisers.

At step 530 of the method 500, one or more advertisement results may be generated across the one or more application verticals, based upon the search of the advertisement database. In various embodiments, the advertisement results may be targeted based on a current search result, where the current search result is from the processed database and is provided in response to the search query. The advertisement results may also be targeted based on user demographics (e.g., from an end user profile submitted to the search server), user interest, activity history of a user on the Internet service, or any combination thereof. The revenues generated from advertising may be shared with service providers and other parties involved using, for example, service provider accounts such as service provider account 150.

At step 540 of the method 500, the one or more advertisement results may be transmitted via the network (e.g., for display to the end user). The one or more advertisement results may be associated with one or more search results, as described above. The advertisement results may be transmitted in an advertisement list, for example, organized in order of relevance to the historic search parameters. The advertisement list may be presented in any suitable fashion, such as in a separate area of a search results page that includes search results from the processed database transmitted in response to the end user's search query.

Also, the methods and/or steps described herein may be combined. For example, the method 300 may be combined with the method 500 to provide search results and advertisement results in various embodiments.

In an optional step, the method 500 may further include organizing the one or more advertisement results based upon a bid value associated with each advertisement result. Each advertisement result may be associated with an advertiser. Within the advertisement database, which includes records having at least one field for each record, there may be a field for bid value. When a record in the advertisement database is included in the advertisement results, the advertisement results may be organized such that, for example, records having higher bid values may be located earlier in the advertisement results. Organizing the advertisement results based upon bid value fields may advantageously promote competition among advertisers in the advertisement database, who may wish to increase a bid value associated with a given record to increase visibility of that record within the advertisement results.

Bid values may be associated with keywords in various embodiments. When a keyword within search parameters of the search query is used to search the advertisement database, multiple advertiser records may be included in the advertisement results. By bidding higher than a competitor on the keyword, a service provider may promote its service and related products/offerings by causing the service provider to appear more prominently within the advertisement results (e.g., by placing the service provider's advertisement higher in the advertisement results, or by highlighting the service provider's advertisement using images or rich content). Thus, keyword bidding system may be offered to the advertisers to promote their applications and offerings based on search parameters and/or search terms.

Advertising provided with search results may provide many ways of monetizing the functionality provided to service providers. Revenue may be provided to a provider of the search server described above based on a pay-per-click model. Advertisers participating in the advertisement database pay a predetermined amount when end users click on an advertisement in the advertisement results. Revenues generated from the advertisements on search results of a service provider's processed database may be shared between the service provider and other parties involved.

Figure 6:
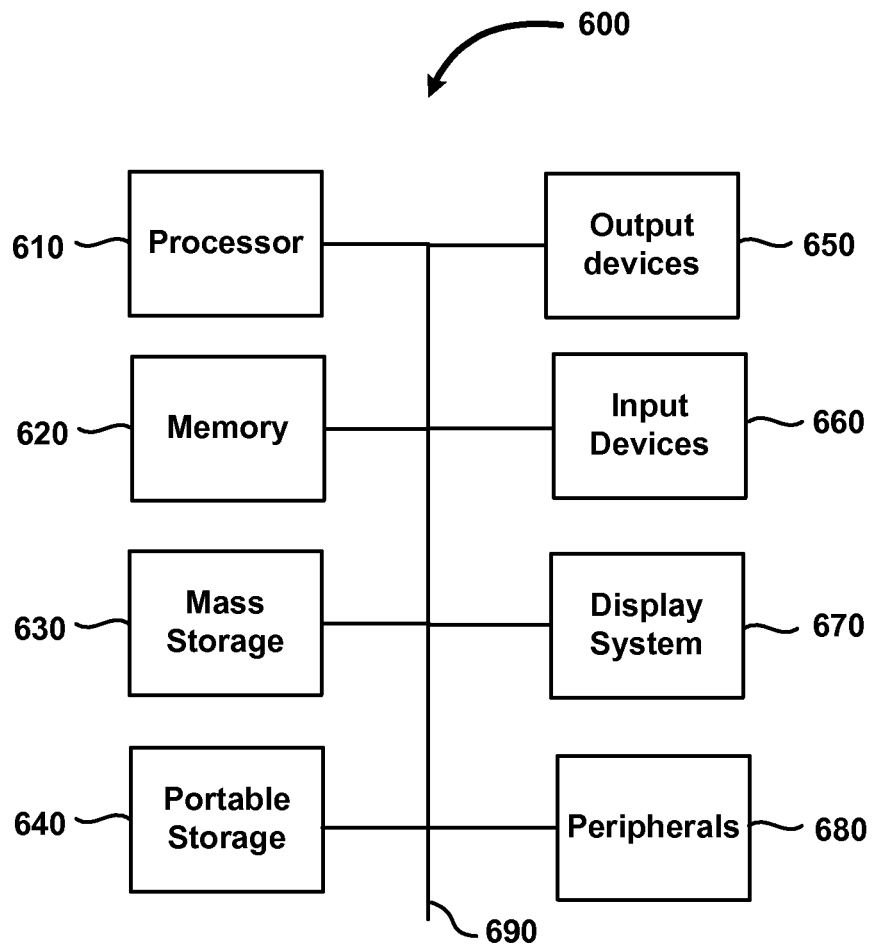
FIG. 6 is a block diagram of an exemplary system for searching one or more databases in accordance with various embodiments of the present invention.

FIG. 6 illustrates an exemplary computing system 600 that may be used to implement an embodiment of the present invention. System 600 of FIG. 6 may be implemented in the context of user devices, search server 180, network cloud 140 and the like. The computing system 600 of FIG. 6 includes one or more processors 610 and main memory 620. Main memory 620 stores, in part, instructions and data for execution by processors 610. Main memory 620 can store the executable code when the system 600 is in operation. The system 600 of FIG. 6 may further include a mass storage device 630, portable storage medium drive(s) 640, output devices 650, user input devices 660, a display system 670, and other peripheral devices 680.

The components shown in FIG. 6 are depicted as being connected via a single bus 690. The components may be connected through one or more data transport means. Processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 620.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Suitable output devices include speakers, printers, network interfaces, and monitors.

Display system 670 may include a liquid crystal display (LCD) or other suitable display device. Display system 670 receives textual and graphical information, and processes the information for output to the display device.

Peripheral devices 680 may include any type of computer support device to add additional functionality to the computer system. Peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents. While the present invention has been described in connection with a series of embodiments, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the invention as described herein. One skilled in the art will further appreciate that the term "Internet content" comprises one or more of web sites, domains, web pages, web addresses, hyperlinks, URLs, any text, pictures, and/or media (such as video, audio, and any combination of audio and video) provided or displayed on a web page, and any combination thereof.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or subcombinations. Each of these processes or steps may be implemented in a variety of different ways. Also, while processes or steps are at times shown as being performed in series, these processes or steps may instead be performed in parallel, or may be performed at different times.

From the foregoing, it will be appreciated that specific embodiments of the system have been described herein for purposes of illustration, but that various modifications may be made without deviating from the spirit and scope of the system. Accordingly, the system is not limited except as by the appended claims.

What is claimed is:

1. A method for providing advertising in one or more search results, the method comprising:
    receiving at least one database on a computer system from at least one service provider via a network, the at least one database being one of a plurality of databases, each database in the plurality of databases comprising a plurality of items for recognition, each database in the plurality of databases being for a corresponding vertical application;
    processing the at least one database on the computer system based on the plurality of items for recognition;
    receiving on the computer system over the network a sound data input comprising a query for the processed at least one database;
    generating by the computer system phonetic data from the received query, the phonetic data comprising a sequence of phonemes, each phoneme representing a perceptually distinct unit of sound;
    determining one or more search results in the processed at least one database using the computer system based on the phonetic data;
    identifying one or more advertisement results in an advertisement database based on the phonetic data and the determined one or more search results using the computer system, the advertisement database being communicatively coupled to the computer system; and
    transmitting the one or more search results and the one or more advertisement results from the computer system to a remote computer system.

2. The method of claim 1, wherein the method further comprises organizing the one or more advertisement results by the computer system based on a bid value associated with each of the one or more advertisement results.

3. The method of claim 1, wherein the one or more advertisement results are related to the query.

4. The method of claim 1, wherein the one or more advertisement results are related to a plurality of queries associated with a single service provider.

5. The method of claim 1, wherein the one or more advertisement results are related a plurality of queries associated with a plurality of service providers.

6. The method of claim 1, wherein the identifying one or more advertisement results is further based on at least one of a current search result, user demographics, user interest, and an activity history of a user.

7. The method of claim 1, wherein the query further comprises at least one of text, a spoken word sound, and an image.

8. The method of claim 1, wherein processing each of the at least one database comprises producing phonetic data for each of the plurality of items for recognition.

9. The method of claim 1, wherein determining one or more search results in the processed at least one database comprises matching the query with one or more of the plurality of items for recognition within the at least one database.

10. The method of claim 1, wherein the plurality of items for recognition comprises at least one of a destination web address field, a record description field, a record image field, and a record rich content field.

11. The method of claim 1, wherein the plurality of items for recognition comprises a ranking priority based on a desired search result order.

12. The method of claim 11, further comprising organizing the one or more search results based upon the ranking priority.

13. The method of claim 1, wherein the query includes a command and the method further comprises performing a search action of the at least one database by the computer system based on the command.

14. The method of claim 1, the processing the at least one database comprising:
    generating corresponding features for each of one or more of the plurality of items for recognition; and
    generating corresponding rankings for each of one or more of the plurality of items for recognition.

15. A system for providing advertising in one or more search results, the system comprising:
    a computing device comprising at least one database relating to at least one service provider, the at least one database being one of a plurality of databases, each database in the plurality of databases comprising a plurality of items for recognition, each database in the plurality of databases being for a corresponding vertical application; and
    a server coupled to the computing device via a network, the server being configured to execute instructions stored in memory to:
        receive the at least one database from the computing device via the network;
        process the at least one database based on the plurality of items for recognition;

receive on the server over the network a sound data input comprising a query for the processed at least one database;

determine one or more search results in the processed at least one database based on the query;

identify one or more advertisement results in an advertisement database based on at least one of the query and the determined one or more search results, the advertisement database being communicatively coupled to the server; and transmit the one or more search results and the one or more advertisement results from the server to a remote computer system.

16. The system of claim 15, wherein the server is further configured to execute instructions stored in memory to organize the one or more advertisement results based upon a bid value associated with each of the one or more advertisement results.

17. The system of claim 15, wherein the one or more advertisement results are related to the query.

18. The system of claim 15, wherein the one or more advertisement results are related to a plurality of queries associated with a single service provider.

19. The system of claim 15, wherein the one or more advertisement results are related to search parameters from a plurality of search queries associated with a plurality of service providers.

20. The system of claim 15, the instructions stored in memory to generate one or more advertisement results further comprising instructions to identify the one or more advertisement results based on at least one of a current search result, user demographics, user interest, and activity history of a user on the Internet service.

21. The system of claim 15, the instructions stored in memory to process the at least one database comprising processing the at least one database to produce phonetic data for each of the plurality of items for recognition.

22. The system of claim 15, the instructions stored in memory to determine one or more search results in the processed at least one database comprising instructions stored in memory to match the query with one or more of the plurality of items for recognition within the at least one database.

23. The system of claim 15, wherein the plurality of items for recognition comprise at least one of a destination web address field, a record description field, a record image field, and a record rich content field.

24. The system of claim 15, wherein the plurality of items for recognition comprises ranking a priority based on a desired search result order.

25. The system of claim 15, the instructions stored in memory to process the at least one database comprising instructions to:

generate corresponding features for each of one or more of the plurality items for recognition; and generate corresponding rankings for each of one or more of the plurality of items for recognition.

* * * * *